US012730839B2

(12) United States Patent
Nagata et al.

(10) Patent No.: US 12,730,839 B2
(45) Date of Patent: Sep. 8, 2026

(54) SEARCHING SYSTEM, SEARCHING METHOD, AND SEARCHING PROGRAM

(71) Applicant: MIZUHO RESEARCH & TECHNOLOGIES, LTD., Tokyo (JP)

(72) Inventors: Takeshi Nagata, Tokyo (JP); Toshio Kasama, Tokyo (JP); Hidemasa Maekawa, Tokyo (JP); Masayoshi Shimomoto, Tokyo (JP); Toru Hagiwara, Tokyo (JP); Hiromitsu Tomozawa, Tokyo (JP); Misato Tsuchiya, Tokyo (JP)

(73) Assignee: MIZUHO RESEARCH & TECHNOLOGIES, LTD., Tokyo (JP)

( * ) Notice: Subject to any disclaimer, the term of this patent is extended or adjusted under 35 U.S.C. 154(b) by 273 days.

(21) Appl. No.: 18/570,539

(22) PCT Filed: May 25, 2022

(86) PCT No.: PCT/JP2022/021344
§ 371 (c)(1),
(2) Date: Dec. 14, 2023

(87) PCT Pub. No.: WO2022/270203
PCT Pub. Date: Dec. 29, 2022

(65) Prior Publication Data

US 2024/0281464 A1 Aug. 22, 2024

(30) Foreign Application Priority Data

Jun. 22, 2021 (JP) ................................ 2021-103506

(51) Int. Cl.
*G06F 16/535* (2019.01)

(52) U.S. Cl.
CPC ................................ *G06F 16/535* (2019.01)

(58) Field of Classification Search
CPC ...... G06F 16/535; G06F 16/583; G06F 17/18; G06N 20/00

(Continued)

(56) References Cited

U.S. PATENT DOCUMENTS 9,799,041 B2 * 10/2017 Karty .................... G06N 3/126
11,640,684 B2 * 5/2023 Abdal .................... G06T 11/60 382/156

(Continued)

FOREIGN PATENT DOCUMENTS

JP 2011-039944 A 2/2011
JP 2012-008617 A 1/2012

(Continued)

OTHER PUBLICATIONS

Erik Härkönen, Aaron Hertzmann, Jaakko Lehtinen, Sylvain Paris. GANSpace: Discovering Interpretable GAN Controls. Advances in Neural Information Processing Systems 33 (NeurIPS 2020). https://proceedings.neurips.cc/paper/2020/hash/6fe43269967adbb64ec6149852b5cc3e-Abstract.html. (Year: 2020).*

(Continued)

*Primary Examiner* — Jennifer Mehmood
*Assistant Examiner* — Eric James Shoemaker
(74) *Attorney, Agent, or Firm* — Kilpatrick Townsend & Stockton LLP

(57) ABSTRACT

A control unit outputs, to the user terminal, a first item including a first component value in a plurality of principal components composing items, and a plurality of item candidates including component values that are different from the first component value. The control unit specifies a second item selected in the user terminal from among the plurality of item candidates. The control unit calculates, for each principal component, the positional relationship between the first component value and a second component (Continued)

value of the second item. The control unit calculates, for each principal component, a distribution based on the component values according to the positional relationship. The control unit newly generates, for the second item, a plurality of item candidates on the basis of the distribution based on the component values. The new item candidates are output to the user terminal.

10 Claims, 6 Drawing Sheets

(58) Field of Classification Search
USPC .......................................................... 382/305
See application file for complete search history.

(56) References Cited

U.S. PATENT DOCUMENTS

| | | | | |
|---|---|---|---|---|
| 11,663,265 | B2 * | 5/2023 | Lin | G06N 3/0475 707/736 |
| 11,698,715 | B2 * | 7/2023 | Sugawara | G09G 5/00 715/810 |
| 2022/0365636 | A1 | 11/2022 | Sugawara | |

FOREIGN PATENT DOCUMENTS

| | | | |
|---|---|---|---|
| JP | 2021-005208 | A | 1/2021 |
| WO | 2022/270203 | A1 | 12/2022 |

OTHER PUBLICATIONS

Tejeda-Ocampo, C.; López-Cuevas, A.; Terashima-Marin, H. Improving Deep Interactive Evolution with a Style-Based Generator for Artistic Expression and Creative Exploration. Entropy 2021, 23, 11. https://doi.org/10.3390/e23010011 (Year: 2020).*

S. Liu, D. Li, T. Cao, Y. Sun, Y. Hu and J. Ji. GAN-Based Face Attribute Editing. IEEE Access, vol. 8, pp. 34854-34867, 2020, doi: 10.1109/ACCESS.2020.2974043. (Year: 2020).*

Alireza Zaeemzadeh, Shabnam Ghadar, Baldo Faieta, Zhe Lin, Nazanin Rahnavard, Mubarak Shah, Ratheesh Kalarot; Proceedings of the IEEE/CVF International Conference on Computer Vision (ICCV), 2021, p. 12116-12125 (Year: 2021).*

International Search Report for PCT/JP2022/021344 mailed Jul. 26, 2022, all pages.

* cited by examiner

Fig.5

SEARCHING SYSTEM, SEARCHING METHOD, AND SEARCHING PROGRAM

CROSS REFERENCE TO RELATED APPLICATIONS

This application is a 371 National phase filing of PCT/JP2022/021344, filed May 25, 2022, which application claims priority to Japanese Patent Application No. 2021-103506, filed Jun. 22, 2021, in the Japanese Intellectual Property Office, the contents of which are hereby incorporated by reference in their entirety for all purposes.

TECHNICAL FIELD

The present disclosure relates to a searching system, a searching method, and a searching program for searching for an item such as an image that meets user's preference.

BACKGROUND ART

Search for an item that meets a preference of a user may be performed when information is acquired from the user. For example, various sample images are provided to the user. Then, a technique for identifying a desired image of a user on the basis of a sample image selected by the user has been studied (For example, Patent Literature 1). The image display system described in this document includes a first display control unit that displays a reference image on a display surface. A second display control unit displays multiple candidate images, each having image information different from image information of the reference image, around the display area of the reference image on the display surface. The multiple candidate images can be selected. Then, a search area on a predetermined space is determined on the basis of the image data of the reference image. The search area includes image data of each of the candidate images.

CITATION LIST

Patent Literature

Patent Literature 1: Japanese Patent Application Laid-Open No. 2021 005208

SUMMARY OF INVENTION

Technical Problem

However, there are various criteria by which the user selects an image. Therefore, if the search area determined based on the image data of the reference image is not accurate, it is difficult to efficiently search for an image desired by the user.

Solution to Problem

In one aspect of the present disclosure, a searching system includes a control unit connected to a user terminal. The control unit is configured to output a first item and multiple item candidates to the user terminal based on multiple principal components forming the items. The first item has a first component value. Each of the item candidates has a component value different from the first component value. The control unit is configured to identify the second item selected in the user terminal from the item candidates. The second item has a second component value as a component value different from the first component value. The control unit is configured to calculate a positional relationship between the first component value and the second component value in each of the principal components. The control unit is configured to calculate a component value distribution according to the positional relationship in each of the principal components. The control unit is configured to newly generate multiple item candidates for the second item based on the component value distribution. The control unit is configured to output the newly generated item candidates to the user terminal.

BRIEF DESCRIPTION OF DRAWINGS

FIG. 5 is an explanatory diagram of a processing procedure of a prediction process executed by a prediction unit of FIG. 1 in the embodiment.

DESCRIPTION OF EMBODIMENTS

A searching system, a searching method, and a searching program according to an embodiment will be described with reference to FIGS. 1 to 7. In the present embodiment, it is assumed that the user searches for a preferred item according to the preference. Face images of a person, which are two-dimensional still images, are used as items.

Figure 1:
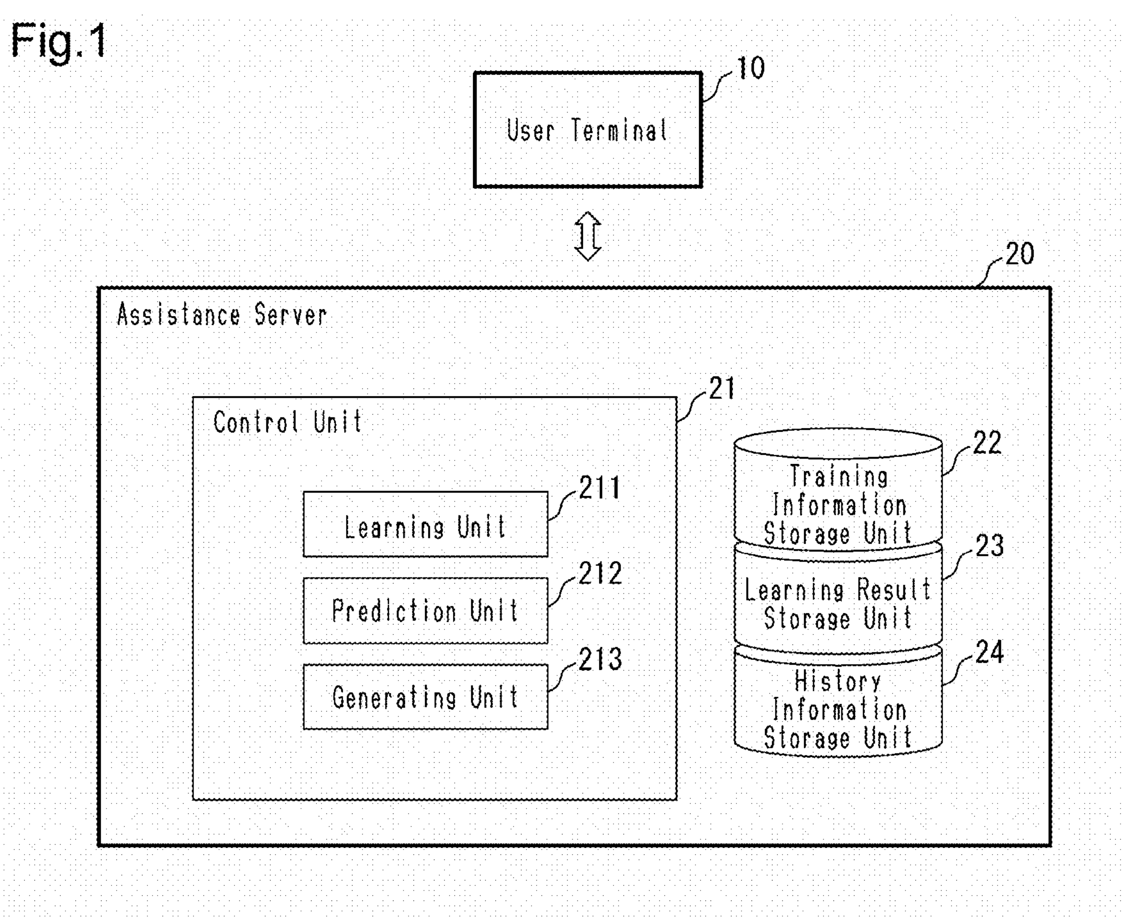
FIG. 1 is an explanatory diagram of a searching system according to an embodiment.

As illustrated in FIG. 1, the searching system of the present embodiment uses a user terminal 10 and an assistance server 20 connected to each other via a network.

Example of Hardware Configuration

Figure 2:
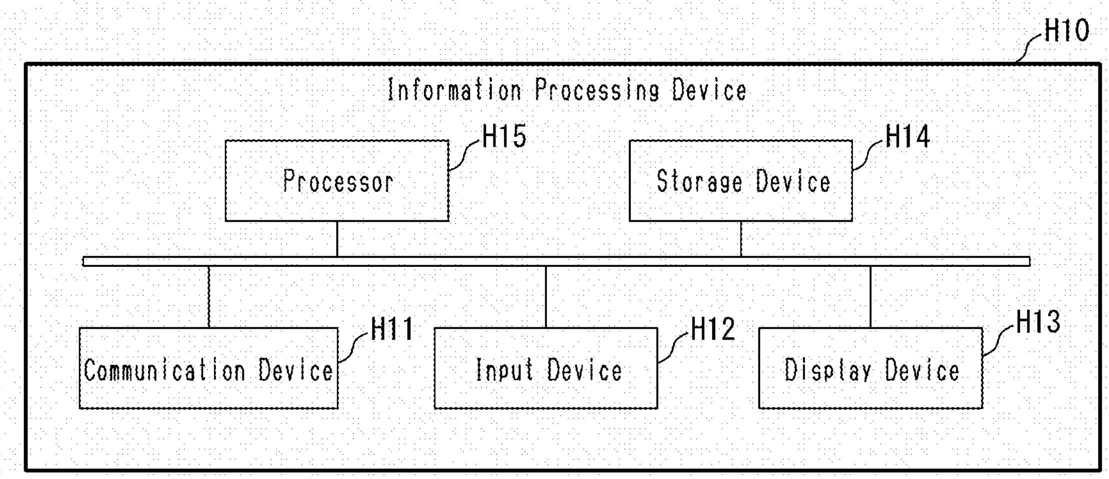
FIG. 2 is an explanatory diagram of a hardware configuration of each of a user terminal and an assistance server of FIG. 1 in the embodiment.

FIG. 2 is an example of hardware configuration of an information processing device H10 that functions as each of the user terminal 10, the assistance server 20, and the like.

The information processing device H10 includes a communication device H11, an input device H12, a display device H13, a storage device H14, and a processor H15. This hardware configuration is an example, and other hardware may be included.

The communication device H11 is an interface that establishes a communication path with another device to transmit and receive data, and is, for example, a network interface, a wireless interface, or the like.

The input device H12 is a device that receives an input from a user or the like, and is, for example, a mouse, a keyboard, or the like. The display device H13 is a display, a touch screen, or the like that displays various types of information.

The storage device H14 is a storage device that stores data and various programs for executing various functions of the user terminal 10 or the assistance server 20. Examples of the storage device H14 include a ROM, a RAM, and a hard disk drive.

The processor H15 controls each process in the user terminal 10 or the assistance server 20, for example, a process in a control unit 21 to be described later, using a program or data stored in the storage device H14. Examples of the processor H15 include a CPU, an MPU, and the like. The processor H15 executes various processes corresponding to various processes by loading a program stored in the ROM or the like in the RAM. For example, in a case in which the application program of the user terminal 10 or the assistance server 20 is activated, the processor H15 operates a process of executing each process described later.

The processor H15 is not limited to one that performs software processing on all processes executed by itself. For example, the processor H15 may include a dedicated hardware circuit (for example, an application specific integrated circuit: ASIC) that executes at least part of the processes executed by itself. That is, the processor H15 may be circuitry including: (1) one or more processors that operate according to a computer program, (2) one or more dedicated hardware circuits that execute at least part of various types of processes, or (3) a combination thereof. The processor includes a central processing unit (CPU) and memories such as a random-access memory (RAM) and a read-only memory (ROM). The memories store program codes or commands configured to cause the CPU to execute processes. The memory, which is a non-transitory computer-readable storage medium, includes any type of media that are accessible by general-purpose computers and dedicated computers.

Function of Each Information Processing Device

The functions of the user terminal 10 and the assistance server 20 will be described with reference to FIG. 1.

The user terminal 10 is a computer terminal used by a user who uses the present system.

The assistance server 20 is a computer system for supporting identification of an item desired by the user. The assistance server 20 includes a control unit 21, a training information storage unit 22, a learning result storage unit 23, and a history information storage unit 24.

The control unit 21 performs a searching process including, for example, a learning stage, a prediction stage, a generation stage, and the like, which will be described later. By executing the searching program for this purpose, the control unit 21 functions as a learning unit 211, a prediction unit 212, a generating unit 213, and the like.

The learning unit 211 executes a principal component analysis process of calculating a principal component by using feature quantity forming training images as face images. The learning unit 211 performs dimensionality reduction of elements forming various images, which are, dimensions, by the principal component analysis process. In the present embodiment, the learning unit 211 uses the principal component analysis, but is not limited to the principal component analysis as long as it is a method capable of performing dimensionality reduction. For example, the learning unit 211 may use an auto encoder.

The prediction unit 212 executes a process of predicting the user's preference using the selected sample image, which is the second item, for the reference image, which is the first item.

The generating unit 213 executes a process of generating multiple sample images, which are item candidates, using the standard deviation of the principal component. The sample images are candidate images selectable by the user.

The training information storage unit 22 records training information used for the learning process. The training information is recorded before the learning process. The training information includes data related to the training image belonging to the category of the search target item. For example, in a case in which a face of a person is targeted as a category of an item, face images of various persons are used as training images.

The learning result storage unit 23 records learning result information by the learning process. This learning result information is recorded when the learning process is executed. The learning result information includes data related to a principal component forming a training image as an item. This principal component is calculated by principal component analysis on the feature quantity of the training image.

The history information storage unit 24 records history information on the item selected by the user. The history information is recorded when the prediction process is executed. The history information includes data related to an image and a principal component value for each generation identifier. As a first-generation item, an initial image generated by the learning process is recorded. The selected images selected in the user terminal 10 are recorded as second and subsequent generations.

The initial image is an average image calculated by principal component analysis of the training information, and is a reference image first presented to the user terminal 10. The selected images are sample images selected according to user's preference with respect to the reference image.

Learning Process

Figure 3:
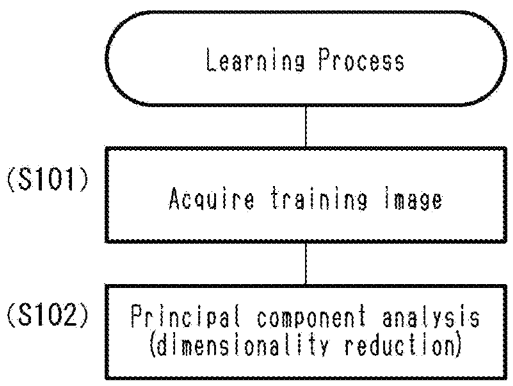
FIG. 3 is an explanatory diagram of a processing procedure of a learning process executed by a learning unit of FIG. 1 in the embodiment.

Next, a learning process will be described with reference to FIG. 3.

First, the control unit 21 of the assistance server 20 executes a training image acquisition process (step S101). Specifically, the learning unit 211 of the control unit 21 calculates a feature quantity of each principal component, that is, each dimension forming each training image recorded in the training information storage unit 22.

Next, the control unit 21 of the assistance server 20 executes a principal component analysis process (step S102). Specifically, the learning unit 211 of the control unit 21 identifies a principal component of the feature quantity by principal component analysis of the feature quantity of each training image. The number of dimensions is reduced by limiting the number of principal components.

Figure 4:
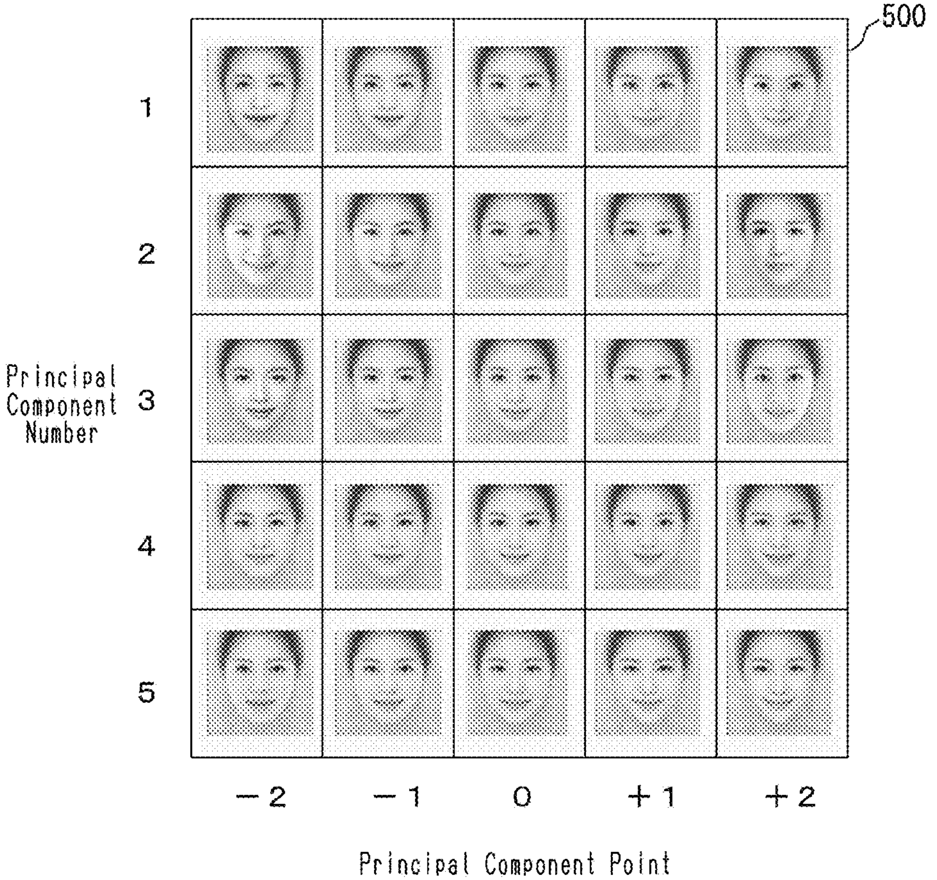
FIG. 4 is an explanatory diagram of sample images generated by a generating unit of FIG. 1 in the embodiment.

FIG. 4 illustrates sample images 500 in which the principal component has been changed. The sample images 500 are examples of images generated by applying the principal component point, that is, the principal component score to the principal component numbers 1 to 5 in descending order of contribution degree in increments of 1 in the range of −2 to +2. In the actual process, as will be described later, sample images are generated by randomly giving principal component points.

Prediction Process

Figure 5:
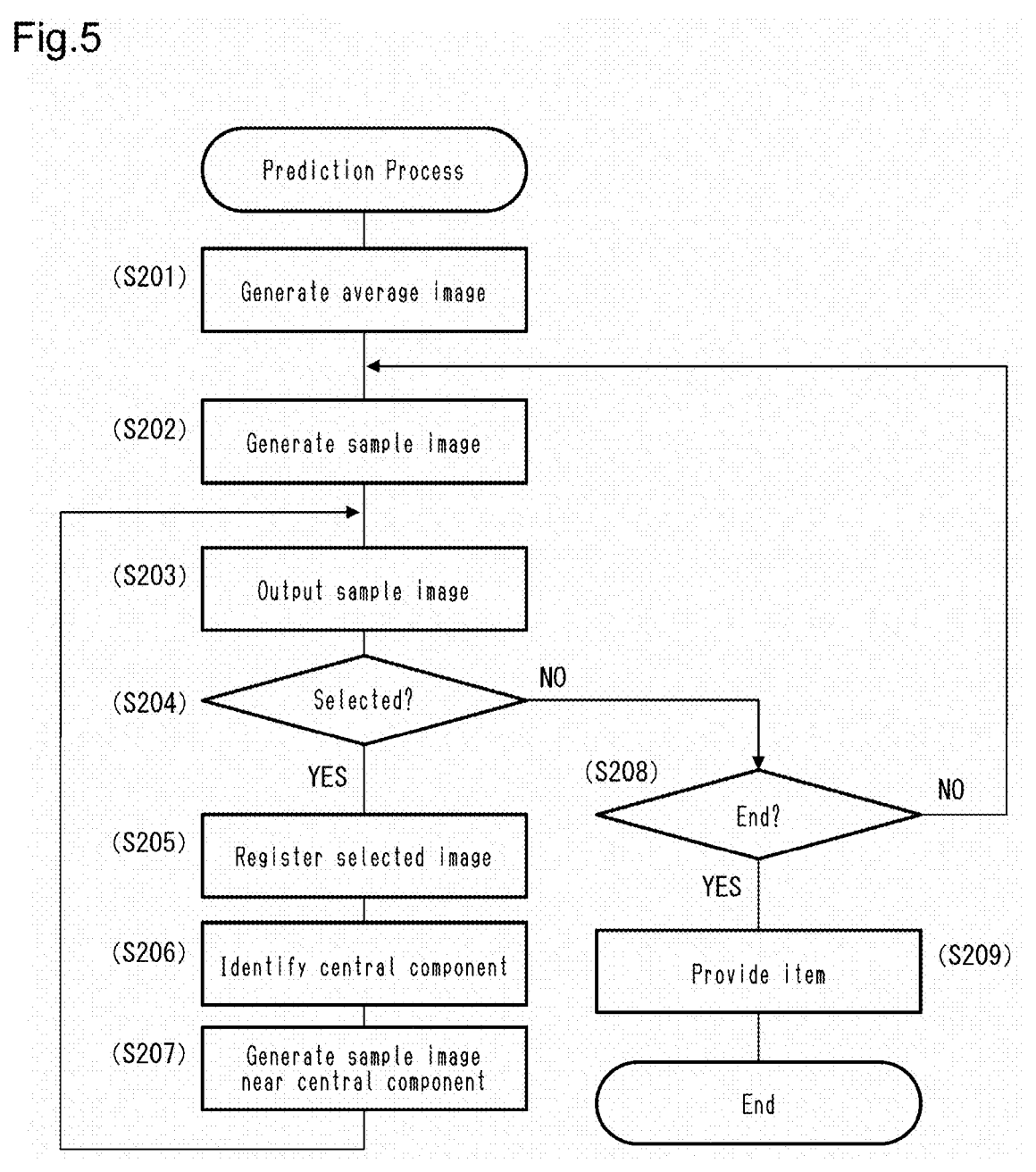

Next, a prediction process will be described with reference to FIG. 5. First, the user who uses the service accesses the assistance server 20 using the user terminal 10.

In this case, the control unit 21 of the assistance server 20 executes an average image generating process (step S201). Specifically, the prediction unit 212 of the control unit 21 calculates an average value of the principal components recorded in the learning result storage unit 23. Next, the prediction unit 212 generates an average item, which is an average face as an initial image, by using the average value of each principal component. A known image generation technique based on machine learning is used. Then, the prediction unit 212 records information regarding the average value of each principal component and the average face in the history information storage unit 24 in association with the generation identifier, which is the first generation.

Next, the control unit 21 of the assistance server 20 executes a sample image generating process (step S202). Specifically, the generating unit 213 of the control unit 21 generates each principal component value from a random number having the standard deviation sd with respect to the average value. The generating unit 213 uses a relatively large value covering the training image as the standard deviation sd at the initial stage, which is the initial standard deviation. Then, the generating unit 213 generates sample images using the generated principal component values. In the present embodiment, sixteen sample images are generated.

Next, the control unit 21 of the assistance server 20 executes a sample image output process (step S203). Specifically, the prediction unit 212 of the control unit 21 outputs a selection screen to the display device H13 of the user terminal 10.

Figure 6:
FIG. 6 is an explanatory diagram of a display screen of a user terminal in the embodiment, in which part (a) of FIG. 6 is a selection screen of a first time, part (b) of FIG. 6 is a selection screen of a second time, part (c) of FIG. 6 is a selection screen of a third time, and part (d) of FIG. 6 is a selection screen of a fourth time.

As illustrated in part (a) of FIG. 6, a selection screen 510 includes a display field for a reference image 511 and a display field of 16 sample images 512. The sample images 512 are randomly arranged, and the user can select any one of the sample images 512. In addition, the selection screen includes a “Regenerate” button and an “End” button. The user selects the “Regenerate” button if the reference image 511 is not preferred and a more preferred sample image 512 is not present. Further, the user selects the “End” button when the reference image 511 is preferable but a more preferable sample image does not exist.

Next, the control unit 21 of the assistance server 20 executes a determination process to determine whether image selection has been performed (step S204). Specifically, when there is a sample image 512 that is more preferable than the reference image 511, the user selects the sample image, which suits the preference. The prediction unit 212 of the control unit 21 detects the presence or absence of selection of a sample image on the selection screen.

If it is determined that a sample image has been selected (YES in step S204), the control unit 21 of the assistance server 20 executes a selected image registration process (step S205). Specifically, the prediction unit 212 of the control unit 21 records information on each principal component value and the selected image in the history information storage unit 24 in association with the generation identifier, which is the second generation.

Next, the control unit 21 of the assistance server 20 executes a central component identifying process (step S206). Specifically, the prediction unit 212 of the control unit 21 identifies the selected image as a new reference image. In this case, the prediction unit 212 identifies each principal component value of the new reference image as the central component.

Then, as illustrated in part (b) of FIG. 6, the prediction unit 212 outputs the selected image on a selection screen 520 as a reference image 521 of the second generation of this generation identifier, here.

Next, the control unit 21 of the assistance server 20 executes a sample image generating process in the vicinity of the central component (step S207). Specifically, the generating unit 213 of the control unit 21 calculates a distance d between the principal component value of the preceding generation, which is a first component value, and the principal component value of the current reference image, which is a second component value, as the positional relationship between the principal components. Then, the generating unit 213 calculates the standard deviation sd using the distance d for each principal component. In this case, a function is used in which the standard deviation sd increases as the distance d increases. For example, the standard deviation sd is calculated using a function f that multiplies the distance d by a proportionality factor $\alpha$. This function is set such that the standard deviation sd calculated by the function is smaller than the initial standard deviation.

Figure 7:
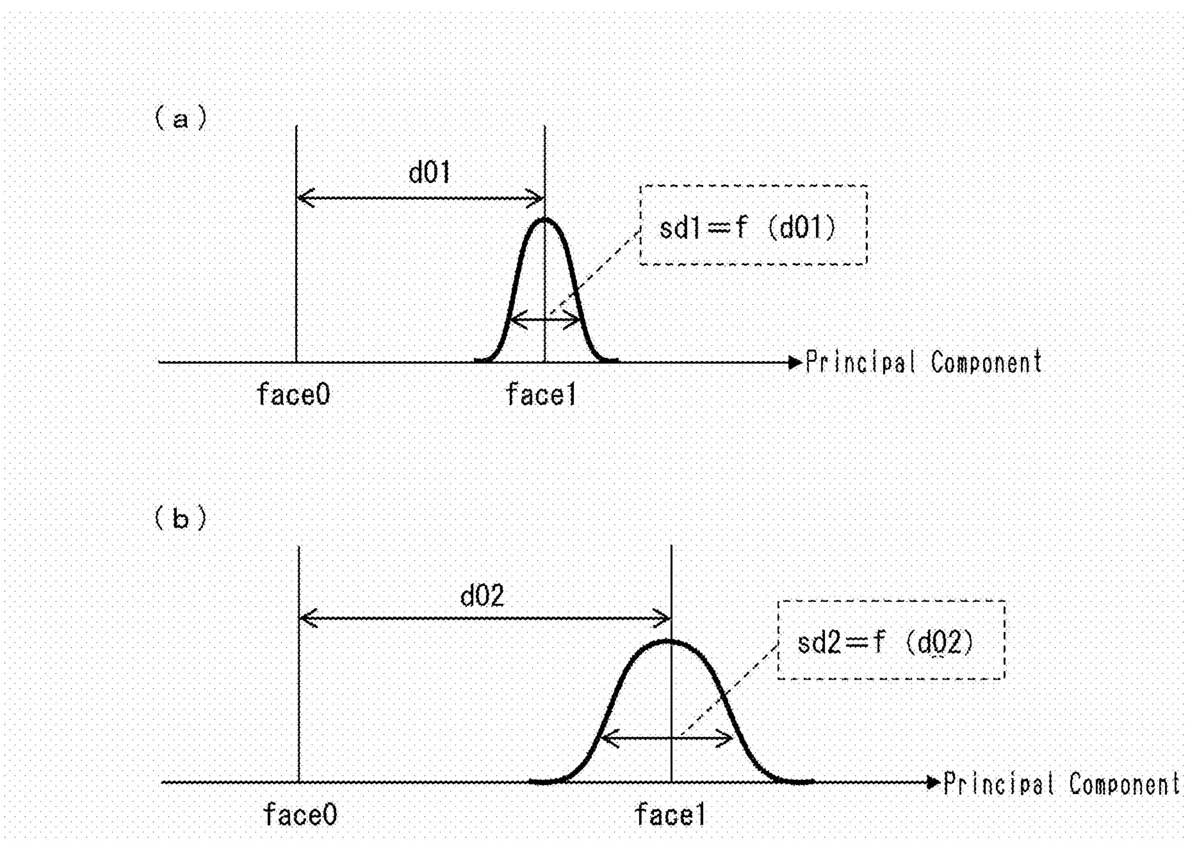
FIG. 7 is an explanatory diagram of generation of sample images executed by the generating unit of FIG. 1 in the embodiment, in which part (a) of FIG. 7 is an explanatory diagram of a case in which the selected image is close to the reference image, and part (b) of FIG. 7 is an explanatory diagram of a case in which the selected image is far from the reference image.

As illustrated in part (a) of FIG. 7, when the distance between a preceding reference image face and a selected image face1 is a distance d01, a standard deviation sd1 (where $sd1=\alpha*d01$) is used. As illustrated in part (b) of FIG. 7, when the distance between the preceding reference image face0 and the selected image face1 is a distance d02, a standard deviation sd2 (where $sd2=\alpha*d02$) is used. When the distance d02>the distance d01, the standard deviation sd2>the standard deviation sd1.

Then, the generating unit 213 generates each principal component value for the central component by a component value distribution of the calculated standard deviation sd, for example, a random number based on a normal distribution. Next, the generating unit 213 generates a sample image using each of the generated principal component values. Then, the control unit 21 of the assistance server 20 repeats the process after the sample image output process (step S203). In a case in which the process after the sample image output process is repeatedly executed, the control unit 21 increases the generation identifier by one each time the process is repeated.

As illustrated in part (b) of FIG. 6, the sample image 512 selected on the selection screen 510 is displayed as the reference image 521 of the second generation on the selection screen 520 by the central component identifying process in step S206. In addition, multiple sample images 522 generated within the standard deviation of the reference image 521 are displayed on the selection screen 520 by the sample image generating process in the vicinity of the central component in step S207.

Thereafter, when the user selects a more preferable image in the sample image 522 on the selection screen 520, the control unit 21 of the assistance server 20 executes a sample image output process (step S203).

In this case, as illustrated in part (c) of FIG. 6, on a selection screen 530, the sample image 522 selected on the selection screen 520 is displayed as a reference image 531 of the third generation. In addition, multiple sample images 532 generated within the standard deviation of the reference image 531 are displayed on the selection screen 530.

Thereafter, the user selects a more preferable image in the sample image 532 on the selection screen 530.

In this case, as illustrated in part (d) of FIG. 6, on a selection screen 540, the sample image 532 selected on the selection screen 530 is displayed as a reference image 541 of the fourth generation. In addition, multiple sample images 542 generated within the standard deviation of the reference image 541 are displayed on the selection screen 540. When there is no sample image 542 more preferable than the reference image 541, the "End" button is selected.

On the other hand, when the "Regenerate" button or the "End" button is selected and it is determined that image selection has not been performed ("NO" in step S204), a determination process is executed to determine whether the process has been ended (step S208). Specifically, the prediction unit 212 of the control unit 21 determines that the process has been ended when detecting that the "End" button is selected.

When the "Regenerate" button is selected and it is determined that the process is not ended ("NO" in step S208), the control unit 21 of the assistance server 20 repeats the process after the sample image generating process (step S202).

Thereafter, when the "End" button is selected so that it is determined that the process is ended (in the case of YES in step S208), the control unit 21 of the assistance server 20 executes an item providing process (step S209). Specifically, the prediction unit 212 of the control unit 21 provides the reference image of the last generation to the user terminal 10.

According to the present embodiment, the following advantages are obtained.

(1) In the present embodiment, the training image acquisition process (step S101) and the principal component analysis process (step S102) are executed. As a result, it is possible to perform an efficient search using dimensionality reduction that narrows down principal elements forming an image.

(2) In the present embodiment, the control unit 21 of the assistance server 20 executes the average image generating process (step S201). As a result, the user's preference can be searched for using the average image in the training images as a starting point.

(3) In the present embodiment, the control unit 21 of the assistance server 20 executes the sample image generating process (step S202). Therefore, in the initial stage, the user's preference can be searched for in a wide range by using a relatively large standard deviation.

(4) In the present embodiment, the control unit 21 of the assistance server 20 executes the sample image output process (step S203). This allows the user to select a preferred image while comparing the reference image with the sample images.

(5) In the present embodiment, when a sample image is selected and it is determined that image selection has been performed (YES in step S204), the control unit 21 of the assistance server 20 executes the selected image registration process (step S205). This records the history of the transition of the image selected by the user.

(6) In the present embodiment, the control unit 21 of the assistance server 20 executes the central component identifying process (step S206) and the sample image generating process in the vicinity of the central component (step S207). Accordingly, a new sample image can be generated in consideration of the selected image. In this case, the standard deviation for generating new sample images is determined according to the distance between the selected image and the reference image. As a result, it is possible to efficiently narrow down the search range by changing the search range according to the distance. That is, when the distance between the selected image and the reference image is long, a search in a wide range is performed, and when the distance between the selected image and the reference image is short, a search in a narrow range is performed. This allows the item desired by the user to be efficiently and accurately identified.

(7) In the present embodiment, when the "Regenerate" button is selected and it is determined that the process is not yet ended (NO in step S208), the control unit 21 of the assistance server 20 repeats the process after the sample image generating process (step S202). As a result, in a case in which an image that satisfies the user is not found, sample images are created again.

(8) In the present embodiment, when the "End" button is selected so that it is determined that the process has been ended (in the case of YES in step S208), the control unit 21 of the assistance server 20 executes the item providing process (step S209). This provides an image that meets user's preference.

The present embodiment can be modified as follows. The present embodiment and the following modifications can be implemented in combination with each other within a range not technically contradictory.

The above embodiment provides an example in which a two-dimensional still image is searched for as an item preferred by the user. However, the search target is not limited to a two-dimensional still image. The above embodiment can be applied to a case in which an item is a search target in which elements forming the item can be quantified in multiple dimensions. For example, the above embodiment can be employed in cases in which a three-dimensional image, a moving image, voice, a sentence, for example, a poetic phrase, an advertising copy, or the like is set as an item to be searched for.

In the above embodiment, one sample image that is more preferable than the currently selected image is selected on the selection screen. The selection method is not limited thereto. For example, the above embodiment may be changed such that two or more sample images can be selected on the selection screen.

Figure 8:
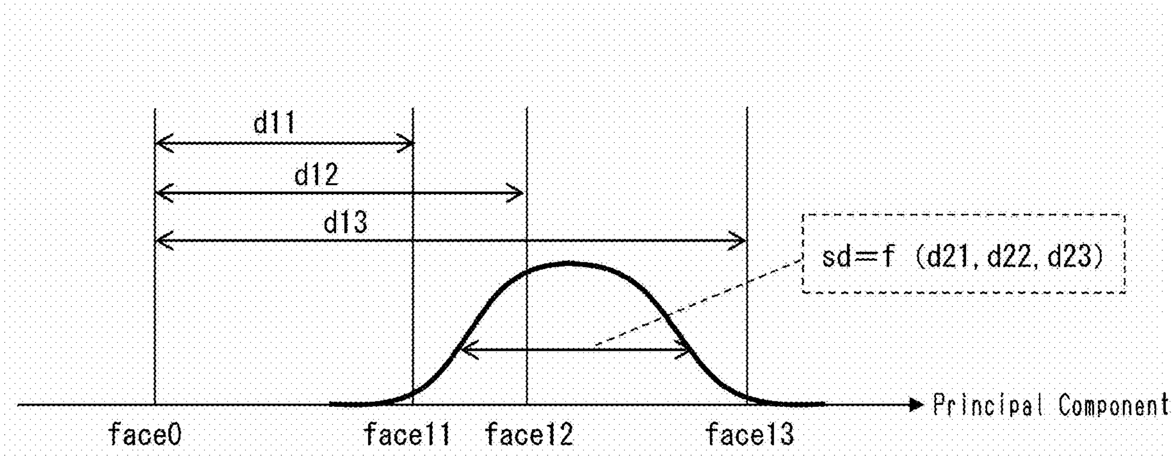
FIG. 8 is an explanatory diagram of generation of sample images executed by the generating unit of FIG. 1 in another embodiment.

FIG. 8 illustrates an example in which multiple sample images face11, face12, and face13 are selected with respect to the reference image face0. In this case, the prediction unit 212 calculates distances d11, d12, and d13 between the reference image face0 and each of the selected sample images face11, face12, and face13. Then, the prediction unit 212 calculates the standard deviation sd by a function having the multiple distances d11, d12, and d13 as variables. Then, the prediction unit 212 calculates the central component by using statistical values of the principal components of the sample images face11, face12, and face13, for example, average values.

For example, the prediction unit 212 uses a function for calculating the standard deviation sd for generating a distribution in consideration of variations in the distances d11, d12, and d13. In this case, for example, the larger the variation of the distances d11, d12, and d13, the larger the standard deviation sd becomes.

As a result, the preference can be searched for using the multiple selected sample images.

In the above embodiment, the user selects one sample that is more preferable than the currently selected image on the selection screen. The selection method is not limited thereto. For example, on the selection screen, the user may select a preferable sample image and a disliked sample image.

Figure 9:
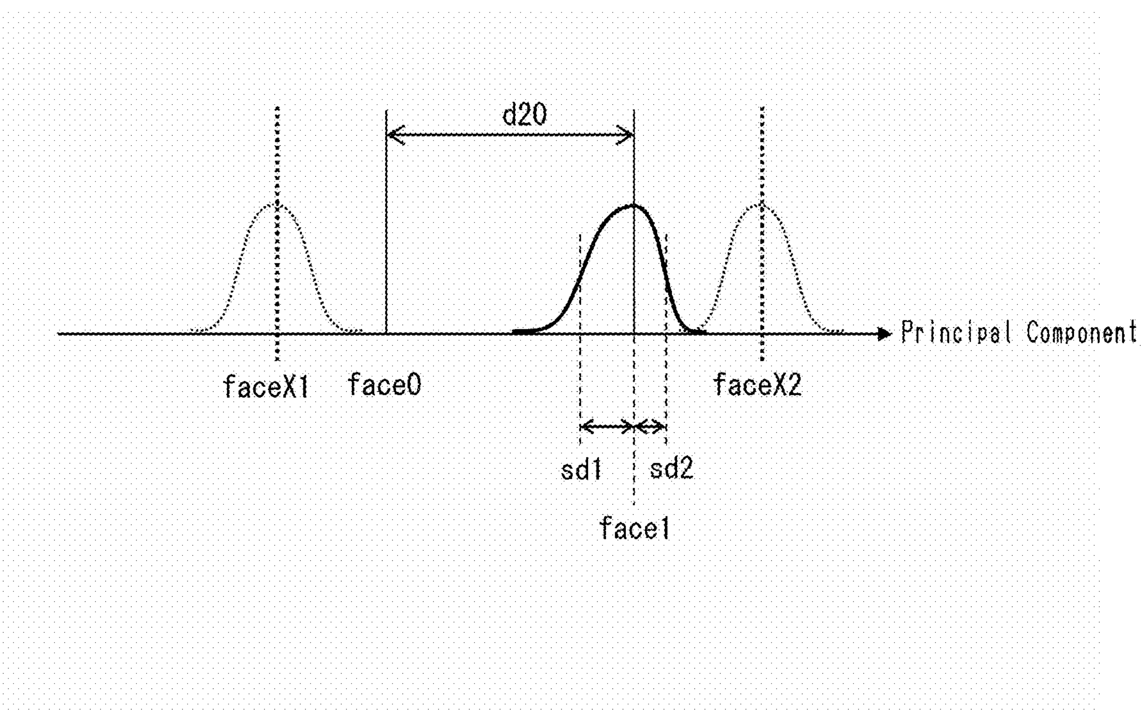
FIG. 9 is an explanatory diagram of generation of sample images executed by the generating unit of FIG. 1 in still another embodiment.

FIG. 9 illustrates an example in which a preferable sample image face1, a disliked sample image faceX1, and a disliked sample image faceX2 are selected by the user with respect to the reference image face0.

In this case, the prediction unit 212 uses the sample image face1 as a new reference image. The prediction unit 212 creates a distribution in the vicinity of the sample image face1 using a standard deviation corresponding to the distance between the sample image face1 and the reference image face0.

Furthermore, the prediction unit 212 adjusts the distribution created in the vicinity of the sample image face1 according to the distance to the disliked sample images faceX1 and faceX2. In order to perform this adjustment, the prediction unit 212 creates a distribution around the disliked sample image faceX1 using a standard deviation corresponding to the distance between the reference image face0 and the disliked sample image faceX1. The prediction unit 212 creates a distribution around the disliked sample image faceX2 using a standard deviation corresponding to the distance between the reference image face0 and the disliked sample image faceX2. Then, the prediction unit 212 adjusts the distribution created in the vicinity of the sample image face1 so as to prevent overlapping between the distribution of the sample image face1 and the distribution of the disliked sample image faceX1 and overlapping between the distribution of the sample image face1 and the distribution of the disliked sample image faceX2.

In FIG. 9, in the distribution created in the vicinity of the sample image face1 using the standard deviation corresponding to a distance d20 between the reference image face0 and the sample image face1, different values are used for the standard deviation sd1 on the disliked sample image faceX1 side and the standard deviation sd2 on the disliked sample image faceX2 side. Specifically, in the distribution of the sample image face1, the distribution of the sample image face1 is adjusted so that the distribution of the sample image face1 does not overlap with the distribution of the disliked sample image by reducing the standard deviation sd2 on the side close to the disliked sample image. That is, the distance between the sample image face1 and the disliked sample image faceX2 is smaller than the distance between the sample image face1 and the disliked sample image faceX1. Therefore, the prediction unit 212 makes the standard deviation sd2 on the disliked sample image faceX2 side smaller than the standard deviation sd1 on the disliked sample image faceX1 side.

Furthermore, the prediction unit 212 may identify a component having a long distance between the reference image and the disliked sample image using the reference image and the disliked sample image. In this case, the prediction unit 212 may use the range of the reference image for the identified component as a new reference image. Furthermore, since there is a possibility that a component having a short distance between the reference image and the disliked sample image is not effective for the user, the prediction unit 212 may remove a component having a short distance between the reference image and the disliked sample image from the principal component of the new reference image.

As a result, new sample images are generated in consideration of a disliked sample image.

In the above embodiment, new sample images are generated using the standard deviation. However, the method for generating new sample images is not limited to the case of using the standard deviation. For example, the range in which the sample images are generated may be calculated using Bayesian estimation.

In this case, the prediction unit 212 creates the range of face1 as a new distribution using face0. The face0 is selected by the user except for the average face in the initial stage.

Figure 10:
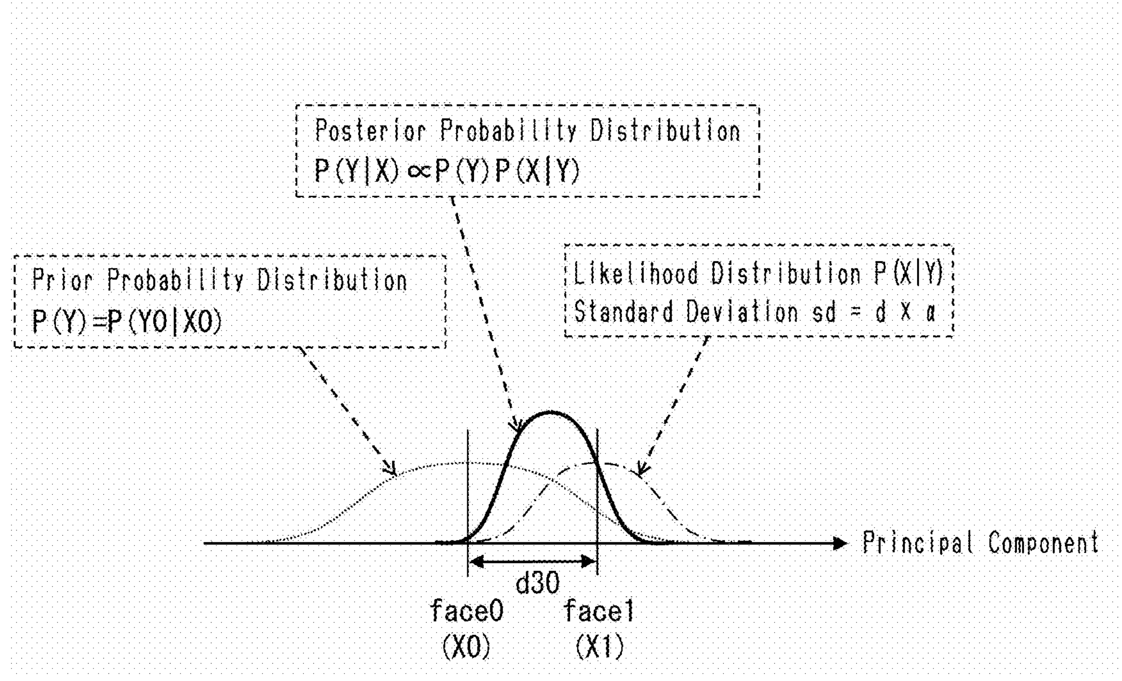
FIG. 10 is an explanatory diagram of generation of sample images executed by the generating unit in FIG. 1 according to still another embodiment.

As illustrated in FIG. 10, the prediction unit 212 uses a posterior probability distribution obtained in the previous search as the prior probability distribution P(Y) (where P(Y)=P(Y0|X0)). Next, as the likelihood distribution P(X|Y), the prediction unit 212 uses a normal distribution centered on the principal component value of the sample image face1 selected by the user. In this case, the prediction unit 212 uses the standard deviation sd (where sd=$\alpha$*d30) for the normal distribution.

Next, the prediction unit 212 calculates a posterior probability distribution, which is a composite distribution, by the following expression.

$$P(Y|X) \propto P(Y)P(X|Y)$$

Then, the prediction unit 212 determines a component value for generating an item with a random number satisfying P(Y|X).

The prediction unit 212 can also consider a component value not selected by the user for the likelihood distribution P(X|Y) of the principal component value of the sample image face1.

The invention claimed is:

1. A searching system, comprising:

control circuitry that is connected to a user terminal, wherein the control circuitry is configured to output a first item and multiple item candidates to the user terminal based on multiple principal components representing the items, the first item having a first component value, and each of the item candidates having a component value different from the first component value, identify a second item selected in the user terminal from the item candidates, the second item having a second component value as a component value different from the first component value, calculate a positional relationship between the first component value and the second component value in each of the principal components, calculate a component value distribution according to the positional relationship in each of the principal components, newly generate multiple item candidates based on the component value distribution, and output the newly generated item candidates to the user terminal, wherein:

the component value distribution comprises a probability distribution having a spread parameter determined based on the positional relationship, and the multiple item candidates are randomly generated by sampling from the probability distribution.

2. The searching system according to claim 1, wherein the control circuitry is configured to calculate the component value distribution according to a distance between the first component value and the second component value.

3. The searching system according to claim 2, wherein the control circuitry is configured to calculate a composite distribution using the component value distribution based on the first component value and the component value distribution based on the second component value, and newly generate multiple item candidates by using the composite distribution.

4. The searching system according to any one of claim 1, wherein the control circuitry is configured to identify a preferred item and a disliked item selected in the user terminal as the second items from the item candidates, calculate the positional relationship by using the first item, the preferred item, and the disliked item, and calculate the component value distribution such that overlap between the component value distribution and a component value of the disliked item is prevented.

5. The searching system of claim 1, wherein:

the spread parameter defines a boundary of a range of values of the probability distribution.

6. The searching system of claim 1, wherein:

the spread parameter comprises a standard deviation of the probability distribution.

7. The searching system of claim 6, wherein:

the standard deviation increases as the positional relationship increases.

8. The searching system of claim 6, wherein:

the standard deviation is calculated using a function that multiplies the positional relationship by a proportionality factor.

9. A method for searching for an item that meets preference of a user by using a searching system, the searching system including control circuitry connected to a user terminal, the method comprising:

outputting, with the control circuitry, a first item and multiple item candidates to the user terminal based on multiple principal components representing the items, the first item having a first component value, and each of the item candidates having a component value different from the first component value;

identifying, with the control circuitry, a second item selected in the user terminal from the item candidates, the second item having a second component value as a component value different from the first component value;

calculating, with the control circuitry, a positional relationship between the first component value and the second component value in each of the principal components;

calculating, with the control circuitry, a component value distribution according to the positional relationship in each of the principal components;

newly generating, with the control circuitry, multiple item candidates for the second item based on the component value distribution; and outputting, with the control circuitry, the newly generated item candidates to the user terminal, wherein:

the component value distribution comprises a probability distribution having a spread parameter determined based on the positional relationship, and the multiple item candidates are randomly generated by sampling from the probability distribution.

10. A non-transitory computer-readable storage medium that stores a searching program causing a processor to execute a searching process for searching for an item that meets preference of a user by using a searching system, the searching system including control circuitry connected to a user terminal, wherein the control circuitry includes the processor, and the searching process includes outputting, with the control circuitry, a first item and multiple item candidates to the user terminal based on multiple dimensionality-reduction elements of feature quantities, the dimensionality-reduction elements including multiple dimensions representing the items, the first item having a first component value, and each of the item candidates having a component value different from the first component value;

identifying, with the control circuitry, a second item selected in the user terminal from the item candidates, the second item having a second component value as a component value different from the first component value;

calculating, with the control circuitry, a positional relationship between the first component value and the second component value in each of the elements;

calculating, with the control circuitry, a component value distribution according to the positional relationship in each of the elements;

newly generating, with the control circuitry, multiple item candidates for the second item based on the component value distribution; and outputting, with the control circuitry, the newly generated item candidates to the user terminal, wherein:

the component value distribution comprises a probability distribution having a spread parameter determined based on the positional relationship, and the multiple item candidates are randomly generated by sampling from the probability distribution.

* * * * *